United States Patent

Nguyen

(10) Patent No.: US 7,769,158 B2
(45) Date of Patent: Aug. 3, 2010

(54) NETWORK SWITCH AND RELATED METHOD USING INTEGRATED SERVICE LOGIC OBJECTS TO HANDLE SERVICE REQUESTS

(75) Inventor: Tuyet-Hoa Thi Nguyen, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 1472 days.

(21) Appl. No.: 10/919,978

(22) Filed: Aug. 17, 2004

(65) Prior Publication Data
US 2005/0191995 A1 Sep. 1, 2005

Related U.S. Application Data

(60) Provisional application No. 60/548,007, filed on Feb. 26, 2004.

(51) Int. Cl.
*H04M 7/00* (2006.01)
(52) U.S. Cl. .............. 379/221.08; 379/219; 379/220.01; 379/221.09; 455/445
(58) Field of Classification Search ............ 379/221.08, 379/221.12, 259; 455/422
See application file for complete search history.

(56) References Cited

U.S. PATENT DOCUMENTS

| | | | |
|---|---|---|---|
| 5,910,984 A * | 6/1999 | Low ............................ 379/279 |
| 6,707,901 B1 * | 3/2004 | Hodges et al. ......... 379/221.09 |
| 6,728,543 B2 * | 4/2004 | Immonen et al. ............. 455/445 |
| 6,876,632 B1 * | 4/2005 | Takeda ....................... 370/259 |
| 7,184,782 B1 * | 2/2007 | Ljungstrom et al. ......... 455/461 |
| 2001/0027100 A1 * | 10/2001 | Immonen et al. ............ 455/422 |

* cited by examiner

*Primary Examiner*—Ahmad F Matar
*Assistant Examiner*—Khai N Nguyen (57) ABSTRACT

A telecommunication switch for operating in a CS-2 intelligent network architecture. The telecommunication switch comprises: 1) integrated service logic (ISL) objects that perform requested services; and 2) a service control function access manager object that receives a first service request and determines if one of the ISL objects can perform a first requested service associated with the first service request. The service control function access manager object, in response to a determination that none of the ISL objects is capable of performing the first requested service, transmits the first service request to a service control function object external to the telecommunication switch. The service control function access manager object, in response to a determination that a first one of the ISL objects is capable of performing the first requested service, causes the first ISL object to perform the first requested service.

20 Claims, 5 Drawing Sheets

NETWORK SWITCH AND RELATED METHOD USING INTEGRATED SERVICE LOGIC OBJECTS TO HANDLE SERVICE REQUESTS

CROSS-REFERENCE TO RELATED APPLICATIONS

The present invention is related to that disclosed in U.S. Provisional Patent Application Ser. No. 60/548,007, entitled "Use of Integrated Service Logic Objects and Interface Handler for In-Switch CS-2 Service Handling in the WCDMA Core Network," filed on Feb. 26, 2004. U.S. Provisional Patent Application Ser. No. 60/548,007 is assigned to the assignee of the present application. The subject matter disclosed in U.S. Provisional Patent Application Ser. No. 60/548,007 is hereby incorporated by reference into the present disclosure as if fully set forth herein. The present invention hereby claims priority under 35 U.S.C. §119(e) to U.S. Provisional Patent Application Ser. No. 60/548,007.

TECHNICAL FIELD OF THE INVENTION

The present invention is directed generally to telecommunication switches and, more specifically, to a switch that uses integrated service logic objects to handle service requests received from external subsystems in a telecommunication network.

BACKGROUND OF THE INVENTION

In the traditional public switched telephone network (PSTN), the addition of a new service frequently required the upgrading of switching equipment and software. This was frequently an expensive and complex process. As new telecommunication services were developed and became widely available, the need to reduce the overhead for using services increased, along with the need to simplify maintenance and service upgrades. These needs led to the development of the Intelligent Network (IN) concept.

The IN concept provided a centralized system that separated services from switching equipment. Thus, a provider may introduce a new service without performing a major modification on multiple switches. In an IN architecture, separate service data is stored in a centralized database outside of switching nodes. An IN architecture also separates service programs (or service logic) and defines protocols that permit the interaction between switching systems and intelligent nodes.

Figure 2:
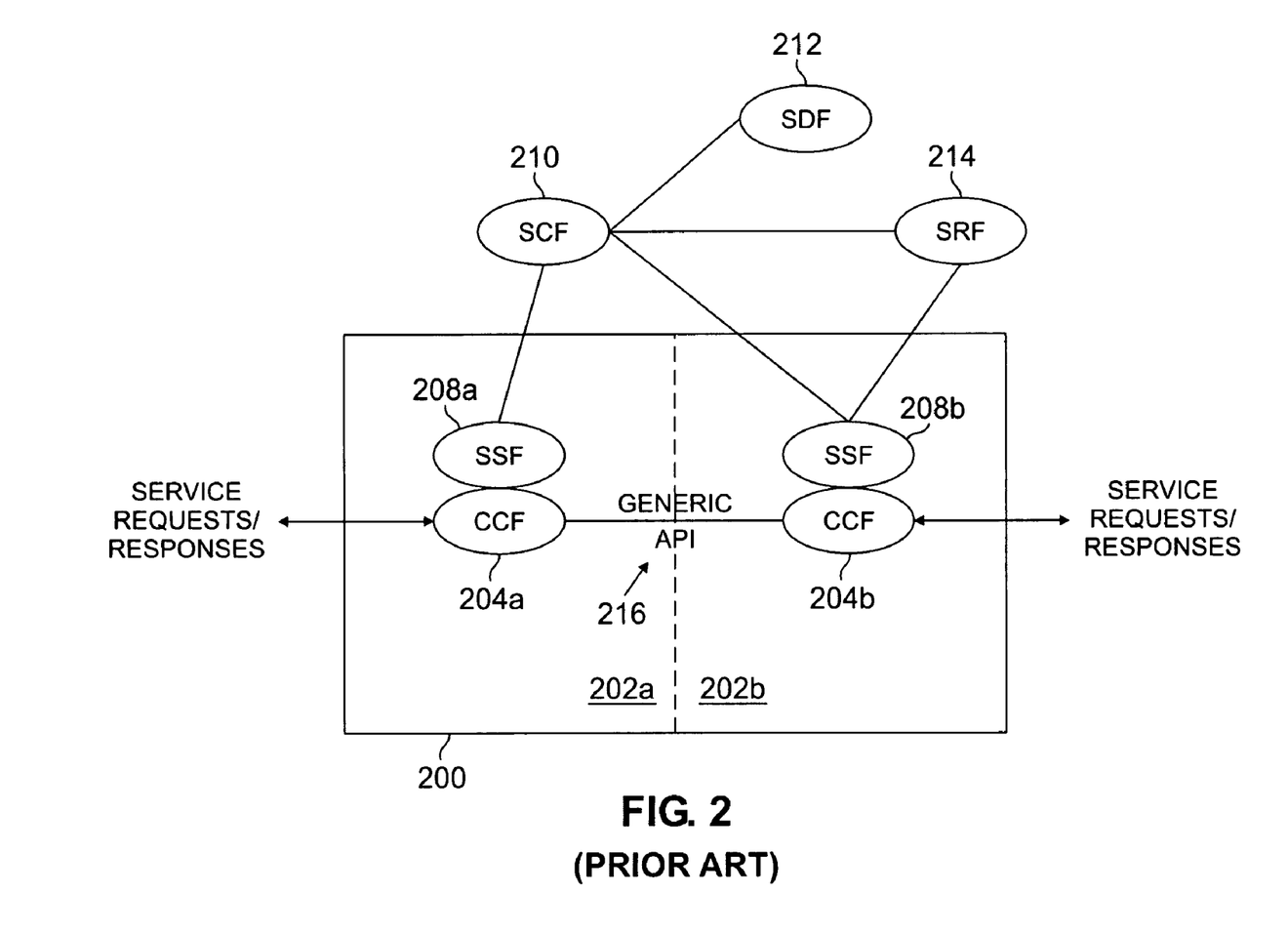
FIG. 2 illustrates a telecommunication switch that is part of a conventional Intelligent Network (IN) architecture according to an exemplary embodiment of the prior art.

FIG. 2 illustrates telecommunication switch 200, which is part of a conventional Intelligent Network (IN) architecture according to an exemplary embodiment of the prior art. In particular, FIG. 2 illustrates an intelligent network (IN) switch model that may be implemented as a mobile switching center (MSC) commonly found in many wireless networks. In this example, switch 200 is a service switching point (SSP) that complies with the International Telecommunication Union—Telecommunications (ITU-T) Capability Set 1 (CS-1) architecture.

For ease of explanation, switch 200 comprises originating side 202a and terminating side 202b. Originating side 202a represents the side of switch 200 that faces the component originating a call and terminating side 202b represents the other side of switch 200. In general, originating side 202a receives and processes a signaling message. Once processing is complete, a function in terminating side 202b is selected and call processing is performed to terminate the call, such as to a trunk line. Depending on which component originates a call, originating side 202a and terminating side 202b of switch 200 may be reversed.

According to the embodiment in FIG. 2, switch 200 comprises two call control functions (CCFs) 204a-204b. Call control functions 204a-204b are responsible for establishing, maintaining, modifying, and releasing telephone calls routed through switch 200. For example, call control function 204a may receive a signaling message indicating that a telephone call is being placed, and call control function 204b facilitates the establishment of a circuit with another component in the system. Call control functions 204a-204b also monitor the overall state of telephone calls routed through switch 200. In addition, call control functions 204a-204b detect particular triggers associated with a telephone call, such as a trigger representing the invocation of a particular feature (e.g., Hold) or a busy signal.

In addition, switch 200 comprises service switching functions (SSFs) 208a-208b. Service switching functions 208a-208b allow switch 200 to interact and communicate with one or more service control functions, such as service control function (SCF) 210, located in service control points (SCPs). For example, when call control functions 204a-204b detect triggers associated with telephone calls, call control functions 204a-204b pass the triggers to service switching functions 208a-208b. Service switching functions 208a-208b then allow switch 200 to pass the triggers to one of the service control points and access the service control function of that service control point. Service control function 210 executes logic for various intelligent network services and may influence the call processing performed by switch 200.

Service control function 210 may interact with service data function (SDF) 212 and specialized resource function (SRF) 214. Service data function 212 provides data to service control function 210, such as data related to customers. For one embodiment, service data function 212 comprises the functionality of a service data point (SDP). Specialized resource function 214 provides additional functionality, such as speech analysis or conference calling functions. In an exemplary embodiment, specialized resource function 214 may comprise the functionality of an intelligent peripheral.

Call control functions 204a and 204b may be accessed using generic application programming interfaces (APIs). Call control functions 204a and 204b receive service requests from, and transmit service responses to, external devices, such as mobile stations (via the base stations of a wireless network). In general, call control functions 204a and 204b transmit and receive signaling control primitives, which may vary from one signaling protocol to another.

The current state of IN development is Capability Set 2 (CS-2). CS-2 enables interworking between IN architectures to provide international services, allows management of both IN services and IN equipment, and supports enhanced IN services, such as mobility services. As in a CS-1 switch, all service requests received in a CS-2 based IN switch are sent to an external application for processing. There are numerous disadvantages to this approach. First, all messages must be encoded and decoded using the Intelligent Network Application Protocol (INAP). Also, all service requests must be transferred as external messages between the switching device and the local SCF. Furthermore, only CS-2 specified subscriber data may be sent to the local SCF. All other subscriber data must be specially formatted or encoded. This makes it difficult to add proprietary information in order to customize services.

Therefore, there is a need in the art for an improved Intelligent Network (IN) switch. In particular, there is a need for a CS-2-based IN switch that performs at least some services in the core network and does not required the use of an external application, such as a service control function (SCF). More particularly, there is a need for a CS-2-based IN switch that transfers messages related to a service request without INAP encoding and decoding.

SUMMARY OF THE INVENTION

The present invention provides an improved telecommunication switch that uses integrated service logic (ISL) objects to perform requested services within the switch. A core network subsystem sends an in-switch integrated service logic (ISL) handler a CS-2 service request. The ISL handler maps the requested service key to an instance of the corresponding ISL object. The invoked ISL object processes the request and communicates back to the core network. If the invoked ISL object is designed to interact with other services (i.e., other ISL objects) for the same subscriber, the invoked ISL object registers with an interface handler (IH) in the switch so that other invoked ISL objects can later communicate with the invoked ISL object. The IH uniquely manages each subscriber during on-going calls. When service processing is complete, the ILS object de-registers from the IH (if needed) and ends the service dialogue for that subscriber. If service processing requires monitoring throughout the call, the ILS object may perform further processing at various stages during the call. The ILS object also may interact with other ISL objects for service interactions for the same subscriber.

To address the above-discussed deficiencies of the prior art, it is a primary object of the present invention to provide a telecommunication switch capable of operating in an ITU-T Capability Set 2 (CS-2) intelligent network architecture. According to an advantageous embodiment of the present invention, the telecommunication switch comprises: 1) a plurality of integrated service logic (ISL) objects, each of the ISL objects capable of performing a requested service; and 2) a service control function access manager object capable of receiving a first service request and determining if one of the plurality of ISL objects is capable of performing a first requested service associated with the first service request.

According to one embodiment of the present invention, the service control function access manager object, in response to a determination that none of the plurality of ISL objects is capable of performing the first requested service, transmits the first service request to a service control function object external to the telecommunication switch.

According to another embodiment of the present invention, the service control function access manager object, in response to a determination that a first one of the ISL objects is capable of performing the first requested service, causes the first ISL object to perform the first requested service.

According to still another embodiment of the present invention, the telecommunication switch further comprises a call control function object capable of receiving the first service request from a requesting device.

According to yet another embodiment of the present invention, the service control function access manager object receives the first service request from the call control function object.

According to a further embodiment of the present invention, the telecommunication switch further comprises an integrated service logic (ISL) handler object, wherein the service control function access manager object transmits the first service request to the ISL handler object and the ISL handler object, in response to receipt of the first service request, creates a first instance of the first ISL object capable of performing the first requested service.

According to a still further embodiment of the present invention, the ISL handler object provides the service control function access manager object a first address associated with the first instance of the first ISL object.

According to a yet further embodiment of the present invention, the ISL handler object provides the first instance of the first ISL object a second address associated with the service control function access manager object.

In one embodiment of the present invention, the service control function access manager object and the first instance of the first ISL object use the first and second address to communicate directly.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications network.

Figure 1:
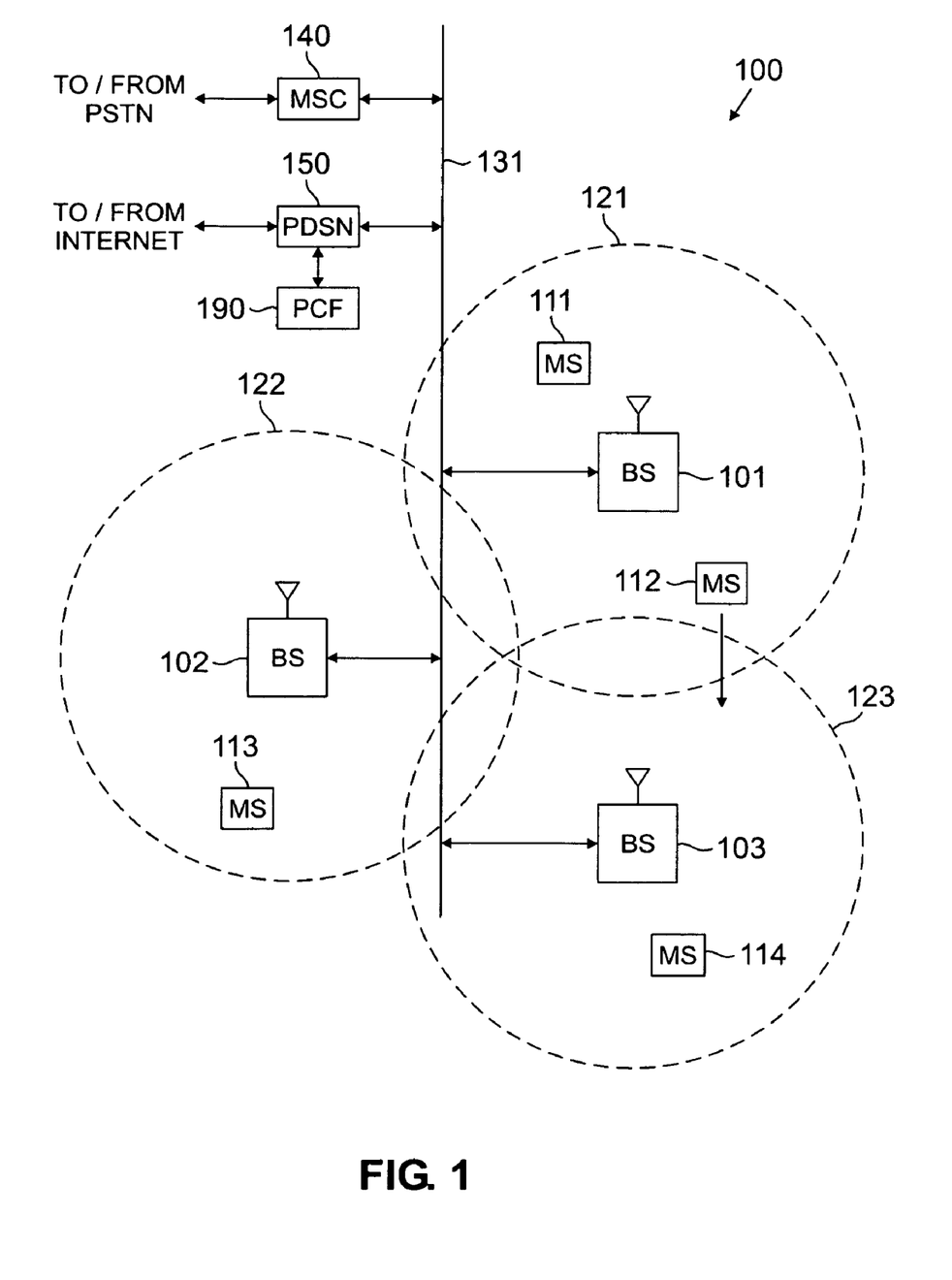
FIG. 1 illustrates an exemplary wireless network that implements switches using integrated service logic objects according to the principles of the present invention.

FIG. 1 illustrates exemplary wireless network 100, which implements a mobile switching center (MSC) using integrated service logic objects according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000-C standard (i.e., Release C of cdma2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 implements at least some services internally using integrated service logic objects according to the principles of the present invention.

Figure 3:
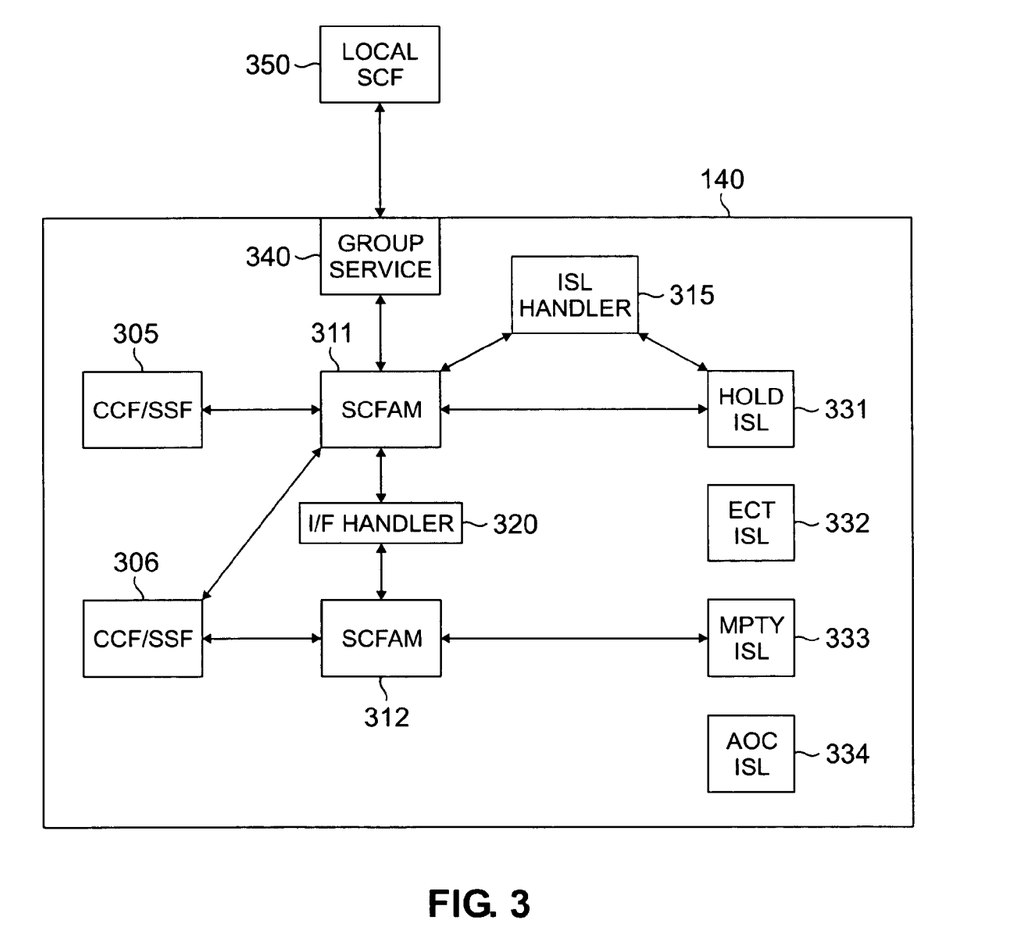
FIG. 3 illustrates selected software objects in an exemplary mobile switching center (MSC) using integrated logic objects according to the principles of the present invention.

FIG. 3 illustrates selected software objects in exemplary mobile switching center (MSC) 140 in greater detail according to an exemplary embodiment of the present invention. MSC 140 comprises call control function/service switching function (CCF/SSF) object 305, call control function/service switching function (CCF/SSF) object 306, service control function access manager (SCFAM) object 311, service control function access manager (SCFAM) object 312, integrated service logic (ISL) handler object 315, interface (I/F) handler object 320, and a plurality of integrated service logic (ISL) objects, including exemplary ISL objects 331, 332, 333 and 334. MSC 140 further comprises group service object 340, which communicates with external local service control function (SCF) object 350.

The integrated service logic objects in MSC 140 perform some of the services that would normally be performed by an external SCF, such as SCF object 350, in a conventional CS-1 Intelligent Network. The services performed by the internal ISL objects may include at least some of: i) a HOLD function, ii) an Explicit Call Transfer (ECT) function, iii) a Multiple Party (MPTY) function, iv) an Advice of Charge (AOC) function, v) a Call Forwarding (CF) function (various types), vi) a Call Deflection (CD) function, vii) a Call Waiting (CW) function, viii) a COLP/COLR function, and ix) a Closed User Group (CUG) function, among others. If a corresponding ISL is provided in MSC 140, the service is performed internally in MSC 140, rather than being sent to local SCF 350.

Each one of integrated service logic (ISL) objects 331-334 is an application that SCFAM object 311 or SCFAM object 312 may invoke to perform the service processing. Each service logic application is designed specifically for a particular service (e.g., Call Hold, Multiple Party, etc.). ISL objects 331-334 use the same thread as SCFAM object 311, thereby eliminating messaging overhead. If it is necessary to invoke a secondary service provided by a second ISL object (e.g., MPTY ISL object 333), CCF/SSF 306 signals SCFAM object 312 to invoke the secondary service. In response, SCFAM 312 interfaces with the ISL handler to create an instance of the service by invoking MPTY ISL object 333. Once SCFAM object 311 (or SCFAM object 312) retrieves a valid ISL instance, SCFAM object 311 (or 312) forwards all INAP operations to the corresponding one of ISL objects 331-334 for processing. SCFAM object 312 may interface with SCFAM object 311 to provide the appropriate service handling for the requested service key.

Figure 4:
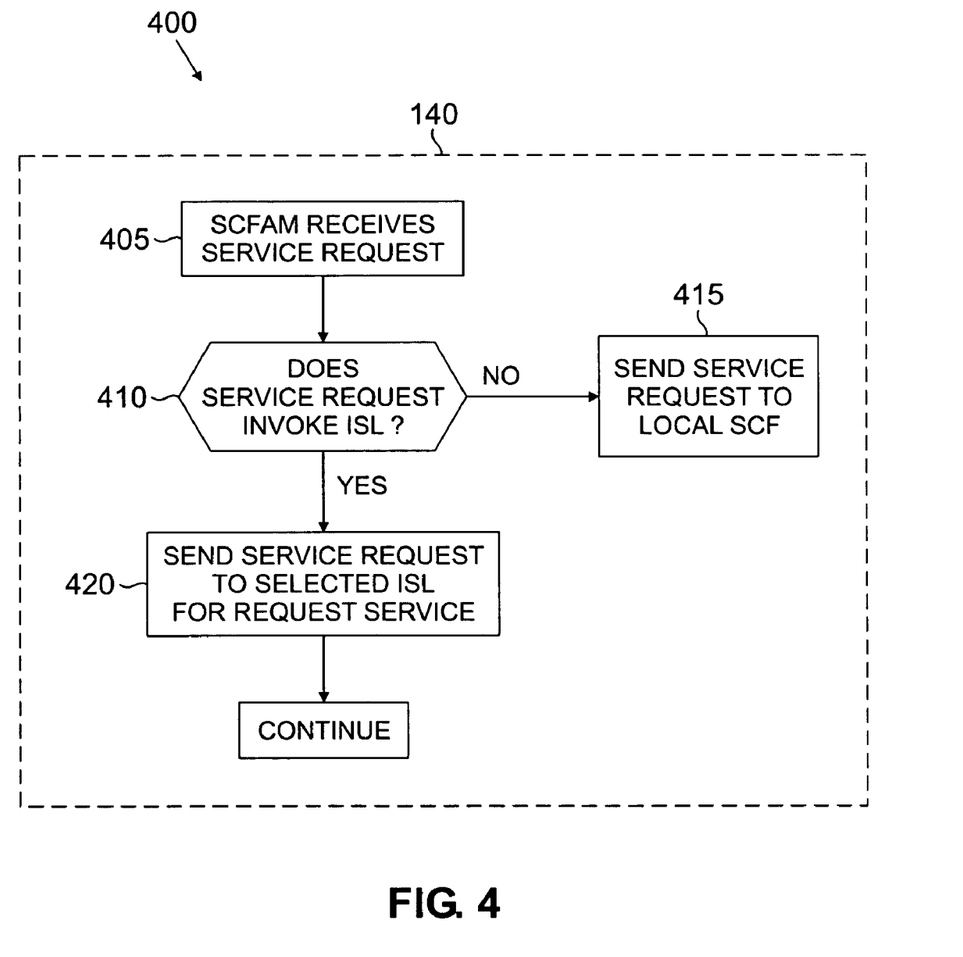
FIG. 4 is a flow diagram illustrates the operation of SCFAM in the MSC according to an exemplary embodiment of the present invention.

FIG. 4 depicts flow diagram 400, which illustrates the operation of selected objects in MSC 140 according to an exemplary embodiment of the present invention. The present invention enables some or all IN services normally supported by Local SCF 305 to be supported instead by the integrated service logic (ISL) objects. Initially, CCF/SSF object 305 receives service requests (e.g., Hold, Call Forward) from external devices, such as mobile stations 111-114. CCF/SSF object 305 invokes a service by sending the Initial Detection Point (InitialDP) request to a corresponding SCFAM object (e.g., SCFAM object 311) (process step 405).

SCFAM object 311 first forwards the request to the Integrated Service Logic (ISL) handler object 315. ISL handler object 315 determines if the SCF Address indicates that the service is to be performed by ISL objects 331-334 and return the appropriate ISL instance to SCFAM object 311 (process step 410). If SCFAM object 311 receives a valid ISL instance, SCFAM object 311 sends the service request (i.e., InitialDP request) to corresponding ISL object (process step 420). If SCFAM object 311 does not receive a valid ISL instance, SCFAM object 311 ASN-encodes the request and sends the encoded request to Local SCF object 350 or other external SCP as indicated by the received SCF Address.

ISL handler 315 maps the service key for each requested service to an instance of the corresponding ISL object (e.g., Hold ISL object 331, ECT ISL object 332, etc.) and returns the ISL object address to the requesting SCFAM object (e.g., SCFAM 311). Thereafter, the ISL object communicates with CCF/SSF object 305 through SCFAM object 311 to provide the integrated switch-based services. This may include service interaction with other ISL objects similar to those provided by the SIM at local SCF 350. Communications between ISL object for service interaction use generic messages over interface handler (IH) object 320. By way of example, Hold ISL object 331 may communicate with MPTY ISL object 333 by transmitting a message through SCFAM object 311, IH object 320, and SCFAM object 312. The ISL object is responsible for encoding and decoding all component messages to and from the mobile station.

For integrated services, CCF/SSF object 305 may access Subscriber-Based Trigger Specification (SBTS) data implemented locally in the software load. CCF/SSF object 305 uses this data to build a trigger table for each subscriber during a call. The trigger table contains information such as SCF Address, Service Key, Basic Service Code, Detection Points, and any trigger criteria. At each detection point in a call, if the trigger criteria are met, CCF/SSF object 305 sends an InitialDP request message to SCFAM object 311. ISL handler object 315 compares the SCF Address to an internally defined integrated SCF Address and determines if the service is supported by one of ISL objects 331-334.

ISL Handler object 315 returns the ISL instance for the requested service, if it is supported by ISL objects 331-334. ISL Handler object 315 has access to locally implemented "Service Key to ISL" mapping data and the integrated SCF Address. CCF/SSF object 305 may send to an ISL object other data specific to each service (such as ECT call state) that is not defined by the ITU-T standards in proprietary parameters in the generic INAP message. ISL objects 331-334 send INAP operations to CCF/SSF object 305 as defined by ITU-T standards.

Subscriber data refers to data specific to each subscriber, such as subscribed-to services and any basic service code for that service. This data may include, for example, MISDN, ForwardingData, CugInfo, and SS-Data, among others. For integrated switch services, subscriber data from a subscriber database (SDB) can easily be obtained by retrieving the SDB pointer stored in IH object 320 for the half call.

Each one of ISL objects 331-334 assigns and maintains the application InvokeId value(s) sent in the IN2 components. The InvokeId values are used in a request-response message pair to and from the mobile station. The InvokeId value may also be used by CCF/SSF object 305 to track armed events.

Advantageously, the use of ISL objects 331-334 supports service interaction. Because service interaction pertains only to those services registered by the same subscriber, the IHSession object may easily provide a Service Registration function to support this task. For example, IHSession may store and provide the SCFAM Session ID of the last held party as needed. In conventional systems, all other data used by service interactions (e.g., between HOLD/ECT, HOLD/MPTY or HOLD/HOLD) do not vary from call to call. Therefore, specific data such as CallSegment ID and Leg ID do not need to be tracked by IH Session object as part of the Service Registration. Instead, each ISL object may store these data locally when the services are invoked.

The following services require service interaction: 1) Hold—interacts with the other call on Hold; 2) Explicit Call Transfer—interacts with a previous call on Hold; 3) Build Multiple Party—interacts with a previous call on Hold or previous call on MptyHold; 4) Hold Multiple Party—interacts with previous call on Hold. SCFAM object 311 support new primitives from other SCFAM object 312 and other SCFAM objects to allow ISL objects to communicate with one another. When an ISL object sends messages to other ISL objects, the destination SCFAM object recognizes that these messages are from other ISL objects and pass the messages along to the correct ISL object.

Conventional service interactions always involve the HOLD service. Services that interact with HOLD need to know the call data and the location of the HOLD ISL object in order to communicate with the HOLD ISL object. The IH Session provides the service registration function to the ISL objects by managing the SCFAM SessionID data of the held ISL object. The IH Session may provide simple function calls to retrieve, store and clear the SCFAM SessionID of the held ISL object. All call related data can also be managed by the IH Session as part of the service registration, but is really not necessary.

By simplifying the service registration data at IH Session, the ISL objects must maintain the call data required for certain service interaction operations. The invoked ISL object communicates the desired operation to the held ISL object. It is the responsibility of the held ISL object to build the INAP operation properly. An example of this is for the ECT ISL object and the BuildMPTY object to notify the held ISL object with a MoveCS notification message. The held ISL object builds the INAP MoveCS operation using its call data, then passes the operation along to the held SCFAM object.

If the IH Session object also manages the call data as part of the service registration, then the invoked ISL objects may retrieve these data directly from the IH Session. For example, the invoked ECT and BuildMPTY can build the MoveCS operation with all of the required data retrieved from IH Session and send it to the held SCFAM directly, without first going to the held ISL for call data. This approach cuts down on the communications between the ISLs during service interaction, but takes up more memory in IH Session. Note that in this example, going to ISL first does not create more messaging overhead because the ECT or BuildMPTY ISL has to send the MoveCS operation over IH only once in either case.

When a HOLD service is requested, the invoked HOLD ISL object 331 registers itself to the IH Session. If the subscriber had already put another party or parties on hold, the IH Session returns the SCFAM SessionID for the held ISL object. The held call could be a result of a HOLD or HoldMPTY service request. Because only one call may be held at any one time, the invoked HOLD ISL 311 must wait for the held call to be retrieved before it can put the current call on hold. The invoked HOLD ISL object 311 waits for a RetrieveReceived notification message from the held ISL object before processing the HOLD service request. When the HOLD service is successfully completed, the invoked HOLD ISL object 331 sends a HoldSuccess notification message to the held ISL object to allow it to process the RETRIEVE request. If no other call is on hold, the invoked HOLD ISL object 331 processes the HOLD service without interacting with any other ISL objects.

When an ECT service is requested, the invoked ECT ISL object 332 checks with IH Session to see if the subscriber has put a party on hold. If the IH Session returns the SCFAM SessionID of the held ISL object, then ECT ISL object 332 sends a MoveCS notification to the held ISL object. The held ISL object builds a Move CS operation and passes it to the SCFAM object. The SCFAM obejct process the MoveCS operation, but sends the ReturnResponse to the held ISL object instead of local SCF object 350. The held ISL object de-registers itself with IH Session and proceeds to send the MoveCSReturnResult notification to the invoked ECT ISL object. The held ISL object then sends a ReleaseCall operation to the held CCF/SSF object. When invoked ECT ISL object 332 receives the MoveCSReturnResult notification, it continues to process the ECT service. In the case where there is no party on hold, the invoked ECT ISL object 332 returns a ReturnError to CCF/SSF object 305.

When a BuildMPTY service is requested, the invoked BuildMPTY ISL object checks with IH Session to see if the subscriber has put a party on hold. The held party could be a result of HOLD or HoldMPTY service request. If IH Session returns the SCFAM sessionId of the held ISL object, then the BuildMPTY ISL object sends a MoveCS notification to the held ISL object. The held ISL object builds an INAP MoveCS operation and passes it to the SCFAM object. The SCFAM object processes the MoveCS operation, but sends the MoveCSReturnResult to the held ISL object instead of local SCF object 350. The held ISL object de-registers itself with IH Session and proceeds to send the MoveCSReturnResult notification to the invoked BuildMPTY ISL object. The held ISL object then sends a ReleaseCall operation to held CCF/ SSF object 305. When the invoked BuildMPTY ISL object receives the MoveCSReturnResult notification, it continues to process the BuildMPTY service. In the case where there is no party on hold, the invoked BuildMPTY ISL object returns an ReturnError to CCF/SSF object 305.

When a HoldMPTY service is requested, the invoked HoldMPTY ISL object registers itself to the IH Session. If the subscriber had already put another party on hold, the IH Session returns the SCFAM SessionID of the held ISL object. Because only one call can be held at anytime, the invoked HoldMPTY ISL object waits for the held call to be retrieved before it can put the current call on hold. The invoked HoldMPTY ISL object waits for a RetrieveReceived notification from the held ISL object, before processing the HoldMPTY service. When the HoldMPTY service is successfully completed, the invoked HoldMPTY ISL object sends a HoldSuccess notification to the held ISL object to allow it to process the RETRIEVE request. In the case where there is no other party on hold, the invoked HoldMPTY ISL object processes the HoldMPTY service without interacting with any other ISL object.

Figure 5:
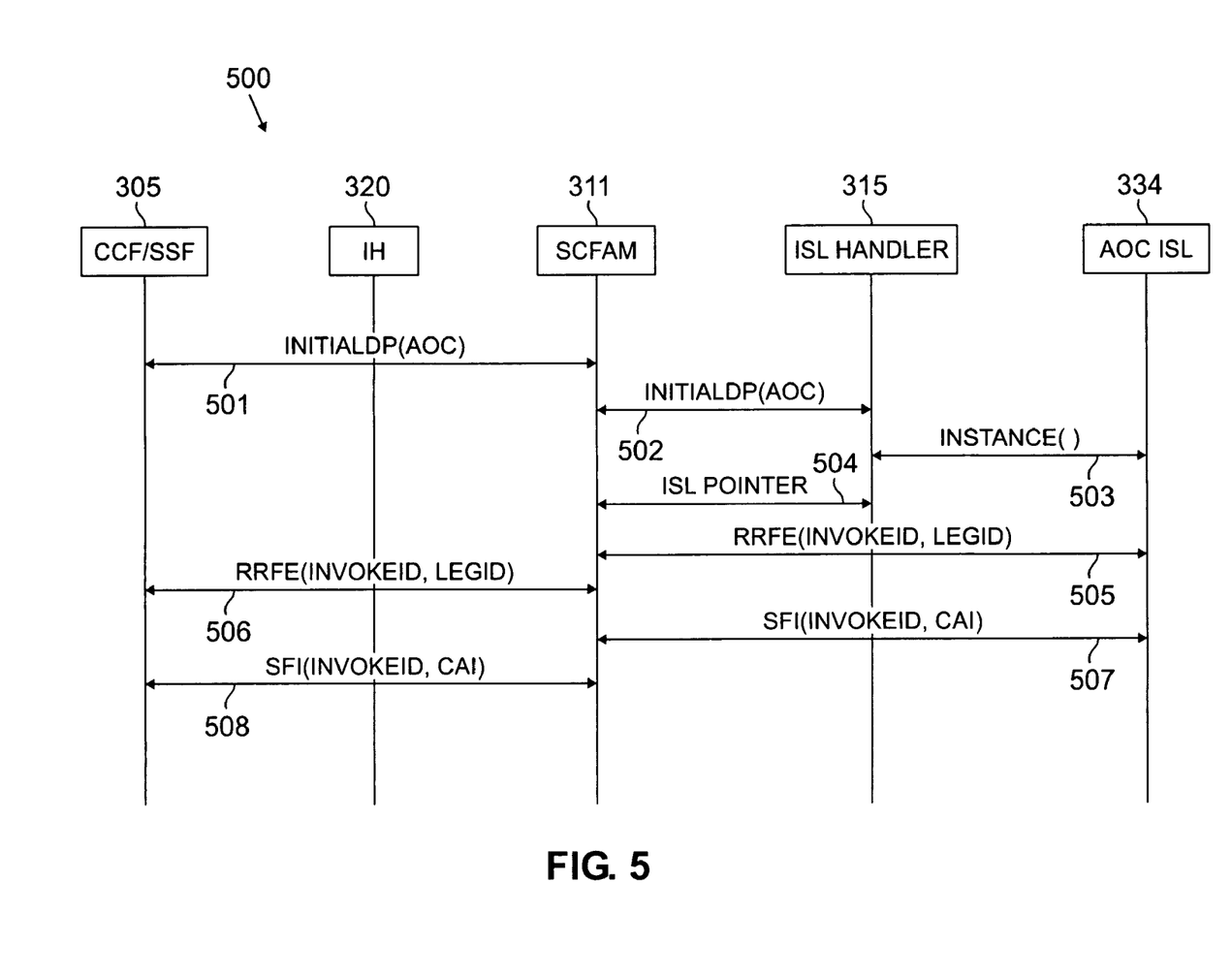
FIG. 5 is a message flow diagram illustrating the use of an exemplary ISL object to perform a service according to the principles of the present invention.

FIG. 5 depicts message flow diagram 500, which illustrates the use of exemplary AOC ISL object 334 to perform a portion of a service according to the principles of the present invention. In response to a services request from an external device (e.g., mobile station), CCF/SSF object 305 transmits InitialDP(AOC) message 501 to SCFAM object 311 via interface handler (IH) object 320. In turn, SCFAM object 311 transmits InitialDP(AOC) message 502 to ISL handler object 315. Since this is a new service request, ISL handler object 315 creates an instance of Advice-of-Charge (AOC) ISL object 334, as indicated Instance( ) message 503. ISL handler object 315 also sends ISL pointer message 504 containing the address for AOC ISL object 334 to SCFAM object 311. Thereafter, AOC ISL object 334 and SCFAM object 311 communicate directly, rather than through ISL handler object 315.

By way of example, AOC ISL object 334 transmits Request Report Facility Event(InvokeID, LegID) message 505 to SCFAM object 311, which in turn transmits RRFE(InvokeID, LegID) message 506 to CCF/SSF object 305. Similarly, AOC ISL object 334 transmits Send Facility Info(InvokeID, CAI) message 507 to SCFAM object 311, which in turn transmits SFI(InvokeID, CAI) message 506 to CCF/SSF object 305.

Advantageously, the present invention eliminates the need for INAP encoding and decoding for messages associated with ISL objects. All messages are internal to the core network and do not need to follow INAP format. Also, communications to handle the service request is entirely within the core network, going through the interface handler (IH) session object only. There present invention also provides easy access to subscriber data, which is stored in the IH session object during the call. Thus, only a minimal amount of work is required to add proprietary information or to customize a service. The present invention provides flexibility for the network operator to either provide service internally (ISL) or through an external SCF process.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in an International Telecommunication Union Telecommunication Standardization Sector (ITU-T) Capability Set 2 (CS-2) intelligent network, a telecommunication switch comprising:

a plurality of integrated service logic (ISL) objects, each of said ISL objects capable of performing a requested service; and a service control function access manager object capable of receiving a first service request and determining if one of said plurality of ISL objects is capable of performing a first requested service associated with said first service request, wherein said determining comprises building a trigger table and comparing a service control function (SCF) address within said trigger table with a list of SCF addresses to determine if said first requested service is supported by one of said plurality of ISL objects wherein the trigger table comprises at least one SCF Address, Service Key, Basic Service Code, Detection Points, and any trigger criteria, and wherein said plurality of ISL objects support service interaction, and wherein an interface handler (IH) IHsession object provides a service registration to promote service interaction supported by said plurality of ISL objects.

2. The telecommunication switch as set forth in claim 1, wherein said service control function access manager object, in response to a determination that none of said plurality of ISL objects is capable of performing said first requested service, transmits said first service request to a service control function object external to said telecommunication switch.

3. The telecommunication switch as set forth in claim 1, wherein said service control function access manager object, in response to a determination that a first one of said ISL objects is capable of performing said first requested service, causes said first ISL object to perform said first requested service.

4. The telecommunication switch as set forth in claim 3, further comprising a call control function object capable of receiving said first service request from a requesting device.

5. The telecommunication switch as set forth in claim 4, wherein said service control function access manager object receives said first service request from said call control function object.

6. The telecommunication switch as set forth in claim 5, further comprising an integrated service logic (ISL) handler object, wherein said service control function access manager object transmits said first service request to said ISL handler object and said ISL handler object, in response to receipt of said first service request, creates a first instance of said first ISL object capable of performing said first requested service.

7. The telecommunication switch as set forth in claim 6, wherein said ISL handler object provides said service control function access manager object a first address associated with said first instance of said first ISL object.

8. The telecommunication switch as set forth in claim 7, wherein said ISL handler object provides said first instance of said first ISL object a second address associated with said service control function access manager object.

9. The telecommunication switch as set forth in claim 8, wherein said service control function access manager object and said first instance of said first ISL object use said first and second address to communicate directly.

10. A wireless network comprising:
a plurality of base stations capable of communicating with a plurality of mobile stations in a coverage area of said wireless network; and
a mobile switching center coupled to each of said plurality of base stations, said mobile switching center comprising:
a plurality of integrated service logic (ISL) objects, each of said ISL objects capable of performing a requested service; and
a service control function access manager object capable of receiving a first service request and determining if one of said plurality of ISL objects is capable of performing a first requested service associated with said first service request, wherein said determining comprises building a trigger table and comparing a service control function (SCF) address within said trigger table with a list of SCF addresses to determine if said first requested service is supported by one of said plurality of ISL objects wherein the trigger table comprises at least one SCF Address, Service Key, Basic Service Code, Detection Points, and any trigger criteria, and wherein said plurality of ISL objects support service interaction, and wherein an interface handler (IH) IHsession object provides a service registration to promote service interaction supported by said plurality of ISL objects.

11. The wireless network as set forth in claim 10, wherein said service control function access manager object, in response to a determination that none of said plurality of ISL objects is capable of performing said first requested service, transmits said first service request to a service control function object external to said mobile switching center.

12. The wireless network as set forth in claim 10, wherein said service control function access manager object, in response to a determination that a first one of said ISL objects is capable of performing said first requested service, causes said first ISL object to perform said first requested service.

13. The wireless network as set forth in claim 12, further comprising a call control function object capable of receiving said first service request from a requesting device.

14. The wireless network as set forth in claim 13, wherein said service control function access manager object receives said first service request from said call control function object.

15. The wireless network as set forth in claim 14, further comprising an integrated service logic (ISL) handler object, wherein said service control function access manager object transmits said first service request to said ISL handler object and said ISL handler object, in response to receipt of said first service request, creates a first instance of said first ISL object capable of performing said first requested service.

16. The wireless network as set forth in claim 15, wherein said ISL handler object provides said service control function access manager object a first address associated with said first instance of said first ISL object.

17. The wireless network as set forth in claim 16, wherein said ISL handler object provides said first instance of said first ISL object a second address associated with said service control function access manager object.

18. The wireless network as set forth in claim 17, wherein said service control function access manager object and said first instance of said first ISL object use said first and second address to communicate directly.

19. For use in a telecommunication switch, a method of handling service requests comprising the steps of:
in a service control function access manager object, receiving a first service request;
determining if one of a plurality of ISL objects in said telecommunication switch is capable of performing a first requested service associated with said first service request, wherein said determining comprises building a trigger table and comparing a service control function (SCF) address within said trigger table with a list of SCF addresses to determine if said first requested service is supported by one of said plurality of ISL objects wherein the trigger table comprises at least one SCF Address, Service Key, Basic Service Code, Detection Points, and any trigger criteria, and wherein said plurality of ISL objects support service interaction, and wherein an interface handler (IH) IHsession object provides a service registration to promote service interaction supported by said plurality of ISL objects;
in response to a determination that none of the plurality of ISL objects is capable of performing the first requested service, transmitting the first service request to a service control function object external to the telecommunication switch; and
in response to a determination that a first one of the ISL objects is capable of performing the first requested service, causing the first ISL object to perform the first requested service.

20. The method as set forth in claim 19, further comprising the step, in response to the determination that the first ISL objects is capable of performing the first requested service, of creating a first instance of the first ISL object for performing the first requested service.

* * * * *